US011625237B2

(12) United States Patent
Decrop et al.

(10) Patent No.: US 11,625,237 B2
(45) Date of Patent: Apr. 11, 2023

(54) AUTONOMOUS CONTEXTUAL SOFTWARE SUPPORT ANOMALY DETECTION AND PLAYBOOK AUTOMATION

(71) Applicant: INTERNATIONAL BUSINESS MACHINES CORPORATION, Armonk, NY (US)

(72) Inventors: Clement Decrop, Arlington, VA (US); Jeremy R. Fox, Georgetown, TX (US); Richard Daniel Gunjal, Bangalore (IN); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 17/337,836

(22) Filed: Jun. 3, 2021

(65) Prior Publication Data
US 2022/0391198 A1 Dec. 8, 2022

(51) Int. Cl.
| | |
|---|---|
| *G06F 8/70* | (2018.01) |
| *G06F 8/36* | (2018.01) |
| *G06F 21/53* | (2013.01) |
| *H04L 67/30* | (2022.01) |
| *H04L 51/046* | (2022.01) |
| *G06Q 30/00* | (2023.01) |

(Continued)

(52) U.S. Cl.
CPC ............... *G06F 8/70* (2013.01); *G06F 8/36* (2013.01); *G06F 21/53* (2013.01); *H04L 51/046* (2013.01); *H04L 67/30* (2013.01); *G06F 2221/033* (2013.01); *G06N 3/04* (2013.01); *G06Q 30/016* (2013.01)

(58) Field of Classification Search
CPC ..... G06F 8/70; G06F 8/36; G06F 21/53; H04L 51/046; H04L 67/30
USPC .................................................. 717/105–130
See application file for complete search history.

(56) References Cited

U.S. PATENT DOCUMENTS 6,071,317 A * 6/2000 Nagel ....................... G06F 8/78
717/131
6,609,128 B1 * 8/2003 Underwood ............ G06F 9/454
707/610

(Continued)

FOREIGN PATENT DOCUMENTS

WO 2006110235 A2 10/2006
WO 2009108943 A2 9/2009

OTHER PUBLICATIONS

Eswaran et al, "Spotlight: Detecting Anomalies in Streaming Graphs", ACM, pp. 1378-1386 (Year: 2018).*

(Continued)

*Primary Examiner* — Anil Khatri
(74) *Attorney, Agent, or Firm* — Daniel J. Hakimi

(57) ABSTRACT

A computer generates a profile, where the profile comprises one or more programs to monitor. The computer determines a baseline for each of the one or more programs by collecting one or more values associated with a normal operation for each of the one or more programs. The computer detects an anomaly based on deviation of the one or more values from the normal operation. Based on identifying a playbook for the anomaly, the computer applies the playbook on the program from the one or more programs. The computer organizes chat services based on identifying one or more members associated with the anomaly.

17 Claims, 5 Drawing Sheets

(51) Int. Cl.
  *G06N 3/04* (2023.01)
  *G06Q 30/016* (2023.01)

(56) References Cited

U.S. PATENT DOCUMENTS

| | | | | |
|---|---|---|---|---|
| 7,624,304 | B2* | 11/2009 | Thiagarajan | G06F 11/366 |
| | | | | 717/124 |
| 7,900,201 | B1* | 3/2011 | Qureshi | G06N 5/048 |
| | | | | 717/124 |
| 8,225,402 | B1* | 7/2012 | Averbuch | H04L 63/14 |
| | | | | 726/22 |
| 8,296,850 | B2 | 10/2012 | Srinivasa | |
| 9,659,085 | B2 | 5/2017 | Wang | |
| 10,291,637 | B1* | 5/2019 | Bardenstein | H04L 63/1416 |
| 10,628,252 | B2 | 4/2020 | Wang | |
| 10,635,565 | B2* | 4/2020 | Dang | G06K 9/6284 |
| 10,666,666 | B1* | 5/2020 | Saurabh | H04L 63/1425 |
| 10,673,721 | B2 | 6/2020 | Hashimoto | |
| 10,713,321 | B1 | 7/2020 | Wen | |
| 10,764,312 | B2 | 9/2020 | Wang | |
| 10,824,726 | B1* | 11/2020 | Herman Saffar | G06F 21/566 |
| 10,846,062 | B1* | 11/2020 | Drake | H04L 63/101 |
| 11,120,009 | B2* | 9/2021 | Asselin | H04L 63/1425 |
| 11,237,939 | B2* | 2/2022 | Chanda | G06F 11/3452 |
| 11,416,325 | B2* | 8/2022 | Mann | G06F 11/079 |
| 11,533,373 | B2* | 12/2022 | Movshovitz | H04L 67/142 |
| 2013/0103195 | A1 | 4/2013 | Anhalt | |
| 2014/0033324 | A1 | 1/2014 | Kiang | |
| 2017/0061322 | A1 | 3/2017 | Chari | |
| 2017/0208151 | A1 | 7/2017 | Gil | |
| 2018/0053207 | A1 | 2/2018 | Modani | |
| 2019/0268214 | A1 | 8/2019 | Maes | |
| 2020/0067952 | A1 | 2/2020 | Deaguero | |
| 2020/0073982 | A1 | 3/2020 | Kolluri Venkata Sesha | |
| 2020/0174869 | A1 | 6/2020 | Chen | |
| 2020/0228555 | A1 | 7/2020 | Wittenschlaeger | |
| 2021/0306352 | A1* | 9/2021 | Narula | H04L 63/1416 |

OTHER PUBLICATIONS

Tellis et al, "Detecting Anomalies in Data Stream Using Efficient Techniques : A Review", IEEE, pp. 296-298 (Year: 2018).*

Sathya et al, "Efficient Anomaly Detection and Mitigation in Software Defined Networking Environment" , IEEE, pp. 479-484 (Year: 2015).*

Liu et al, "Opprentice: Towards Practical and Automatic Anomaly Detection Through Machine Learning", ACM, pp. 1-14 (Year: 2015).*

Baluda et al, A Framework for Automatic Anomaly Detection in Mobile Applications:, IEEE, pp. 297-298 (Year: 2016).*

Ardulov et al, "Self-learning Machine Method for Anomaly Detection in Real Time Data", IEEE, pp. 1-5 (Year: 2018).*

Kloft et al, "Automatic Feature Selection for Anomaly Detection", ACM, pp. 71-76 (Year: 2008).*

Dhamdhere et al., "Peer Group Analysis In Identity And Access Management To Identify Anomalies," International Journal of Engineering and Technology (IJET), vol. 9, No. 3S, Jul. 2017, DOI: 10.21817/ijet/2017/v9i3/170903S020, pp. 116-121.

Ebrahimi et al., "Recognizing Predatory Chat Documents Using Semi-Supervised Anomaly Detection," 2016 Society for Imaging Science and Technology, IS&T International Symposium on Electronic Imaging 2016, Document Recognition and Retrieval XXIII, pp. DRR-063.1-DRR-063.9.

Grand View Research, "Contact Center Software Market Size, Share & Trends Analysis Report By Solution, By Service, By Deployment, By Enterprise Size (Large Enterprise, Small & Medium Enterprise), By End Use, By Region, And Segment Forecasts, 2021-2028," grandviewresearch.com, Published Jan. 2021, Retrieved from the Internet https://www.grandviewresearch.com/industry-analysis/contact-center-software-market, 10 pages.

Hayes et al., "Contextual Anomaly Detection Framework For Big Sensor Data," Journal of Big Data, Springer, Published online: Feb. 27, 2015, vol. 2.2, DOI 10.1186/s40537-014-0011-y, 22 pages.

He et al., "Experience Report: System Log Analysis For Anomaly Detection," IEEE, 2016 IEEE 27th International Symposium on Software Reliability Engineering, DOI 10.1109/ISSRE.2016.21, pp. 207-218.

Mell et al., "The NIST Definition of Cloud Computing", National Institute of Standards and Technology, Special Publication 800-145, Sep. 2011, 7 pages.

Ngo et al., "Contextual-Bandit Anomaly Detection For IoT Data In Distributed Hierarchical Edge Computing," arXiv.org, arXiv:2004.06896v1 [cs.LG] Apr. 15, 2020, 4 pages.

Srinivasan, "The issues with traditional ticketing systems," atspoke.com, [accessed Feb. 15, 2021], Retrieved from the Internet: https://www.atspoke.com/blog/support/issues-traditional-ticketing/, 11 pages.

* cited by examiner

AUTONOMOUS CONTEXTUAL SOFTWARE SUPPORT ANOMALY DETECTION AND PLAYBOOK AUTOMATION

BACKGROUND

The present invention relates, generally, to the field of computing, and more particularly to autonomous anomaly detection and playbook and chat automation to optimally resolve the anomaly.

A ticketing system is a computer software package that manages and maintains lists of issues or anomalies of information technology (IT) systems. Ticketing systems are commonly used by a customer support center of an organization to create, update, and resolve reported customer issues, or even issues reported by employees or developers of the organization. A support ticket typically includes vital information for the account involved and the issue encountered while using the IT system. The ticketing system incorporates issue tracking system that incorporates a knowledge base containing information on each customer, resolutions to common problems, and other information related to the ticket.

SUMMARY

According to one embodiment, a method, computer system, and computer program product for software anomaly management is provided. The present invention may include a computer generates a profile, where the profile comprises one or more programs to monitor. The computer determines a baseline for each of the one or more programs by collecting one or more values associated with a normal operation of the one or more programs. The computer detects an anomaly based on deviation of the one or more values from the normal operation. Based on identifying a playbook for the anomaly, the computer applies the playbook on the program from the one or more programs. The computer organizes chat services based on identifying one or more members associated with the anomaly.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
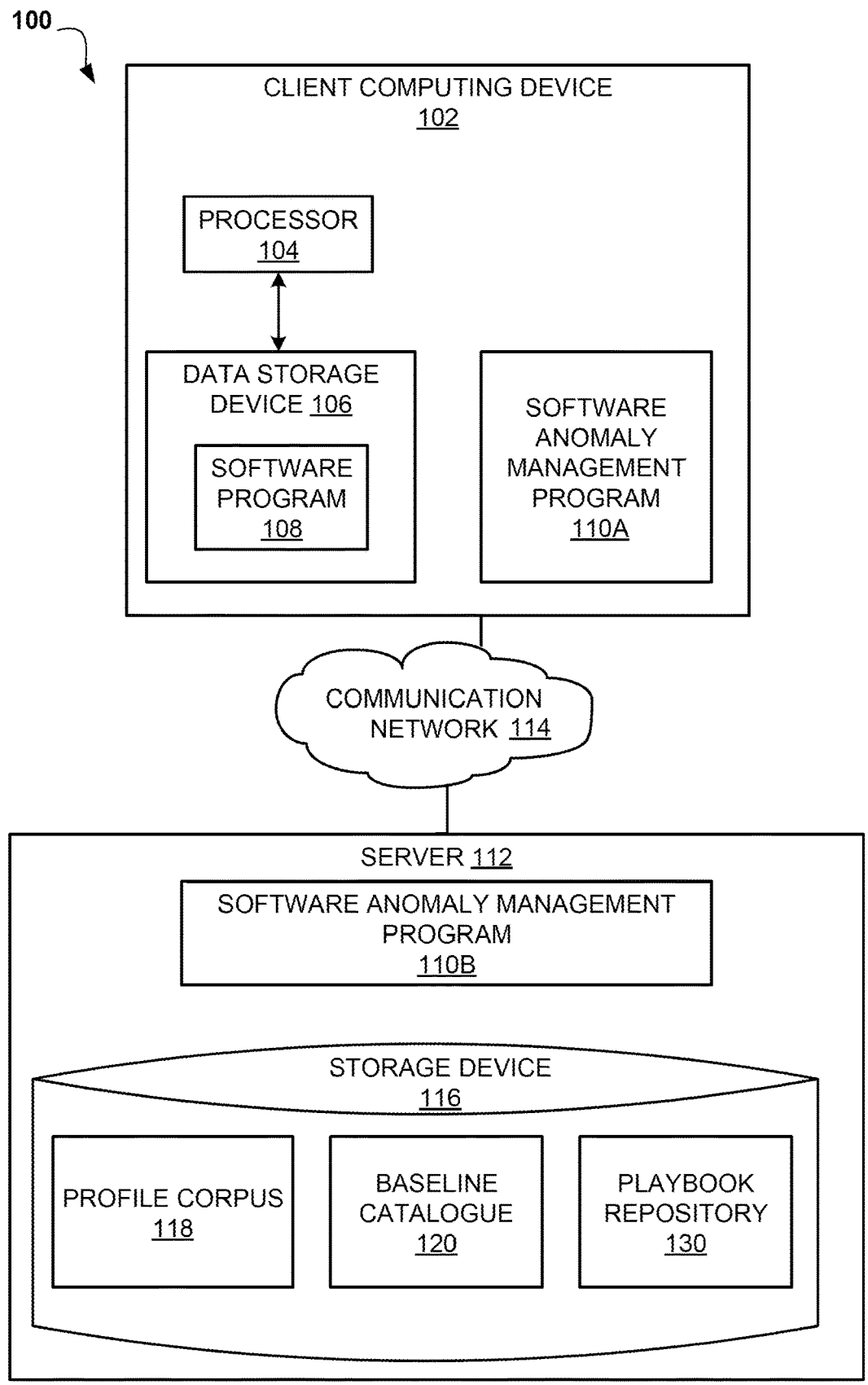
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to software autonomous anomaly detection and playbook and chat automation based on the anomaly. The following described exemplary embodiments provide a system, method, and program product to, among other things, to automatically detect anomalies in software execution and, whenever an automatic solution is not available, identify a group of professionals that may resolve the anomaly and generate a chat between the members of the group to optimize resolution of the anomaly. Therefore, the present embodiment has the capacity to improve the technical field of anomaly detection and its resolution by identifying a group of responsible professionals and enabling their collaboration via chat to resolve the issue in most efficient manner, thus reducing system downtime.

As previously described, a ticketing system is a computer software package that manages and maintains lists of issues or anomalies of information technology (IT) systems. Ticketing systems are commonly used by a customer support center of an organization to create, update, and resolve reported customer issues (anomalies), or even issues reported by employees or developers of the organization. A support ticket, typically, includes vital information for the account involved and the issue encountered while using the IT system. The ticketing system includes an issue tracking system that incorporates a knowledge base containing information on each customer, resolutions to common problems, and other information related to the ticket.

Although ticketing systems allow for organization of the steps to resolving the anomalies in the operation of the IT system, the identification of an exact issue and a group of professionals who may resolve the issue is not automated. Additionally, issue resolution frequently requires a skilled employee who not only understands the specific software but also needs to know all of the available professionals in order to identify the optimal group that may resolve the issue in the most efficient way. As such, it may be advantageous to, among other things, implement a system that organizes all of the previous resolutions of the anomalies in a knowledge base system that includes identified professionals that resolved a specific anomaly, and based on identifying a new anomaly, generating the group of professionals who may resolve the anomaly, in a collaborative environment, such as a chat, to resolve the anomaly.

According to one embodiment, a computerized system or a program may be executed that leverages IT data, expertise conjoining, and topical correlation to bring all the relevant professionals to a common playbook for problem determination and tag all the commands executed in the playbook for building an automated script to production fixes. Furthermore, the software may generate a reference knowledge base that is based on the anomalies for various applications and hashtags for unique anomalies for usage of a deep learning correlating system that crafts an expert conversation to resolve the ticket.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to monitor a computing system for an anomaly and automatically identify a playbook and a group of professionals in a chat to resolve the anomaly in a more efficient way thus reducing system down time.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run multiple programs and services, such as a software program 108 and a software anomaly management program 110A, and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a software anomaly management program 110B and a storage device 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The storage device 116 may store a profile corpus 118, baseline catalogue 120 and playbook repository 130 databases. In another embodiment, the databases may be stored on multiple servers such as server 112 and be accessible via communication network 114. The profile corpus 118 may store user information that may include a name of the user, an organization of the user, hardware parameters associated with each user device, IP addresses of the devices, and software and services the user has opted-in to monitoring by the software anomaly management program 110A, 110B. The baseline catalogue 120 may store values associated with normal operation of each service, system or software the user opted-in to monitor, such as response times of the software, access timeframe, log files of the software and other related to the normal operation data. Playbook repository 130 database may store all the previous anomaly resolution chats, source code associated with the resolved anomaly, hashtags for each resolved anomaly, names and roles of members that participated in the chat service to resolve the anomaly, time between anomaly detection and resolution, log files and values related to the anomaly and other information related to the anomaly data. In another embodiment, the source code may be an instruction or steps that may be performed on a hardware or software to resolve an anomaly. For example, the source code may include an instruction to restart the computer or the service or reinstall one or more components of any available software or hardware component, such as adding additional memory, etc.

According to the present embodiment, the software anomaly management program 110A, 110B may be a program that monitors for anomalies in the operation of a client computing device 102 and server 112 and identifies the appropriate playbook to resolve an anomaly and generate a chat service between the members that may resolve the anomaly in a most efficient manner based on previous anomaly resolution records. Additionally, in one or more embodiments, the client computing device 102 and a server 112 may each individually host a software anomaly management program 110A, 110B. In one or more other embodiments, the software anomaly management program 110A, 110B may be partially hosted on both client computing device 102 and server 112 so that functionality may be separated between the devices. The software anomaly management method is explained in further detail below with respect to FIG. 2.

Figure 2:
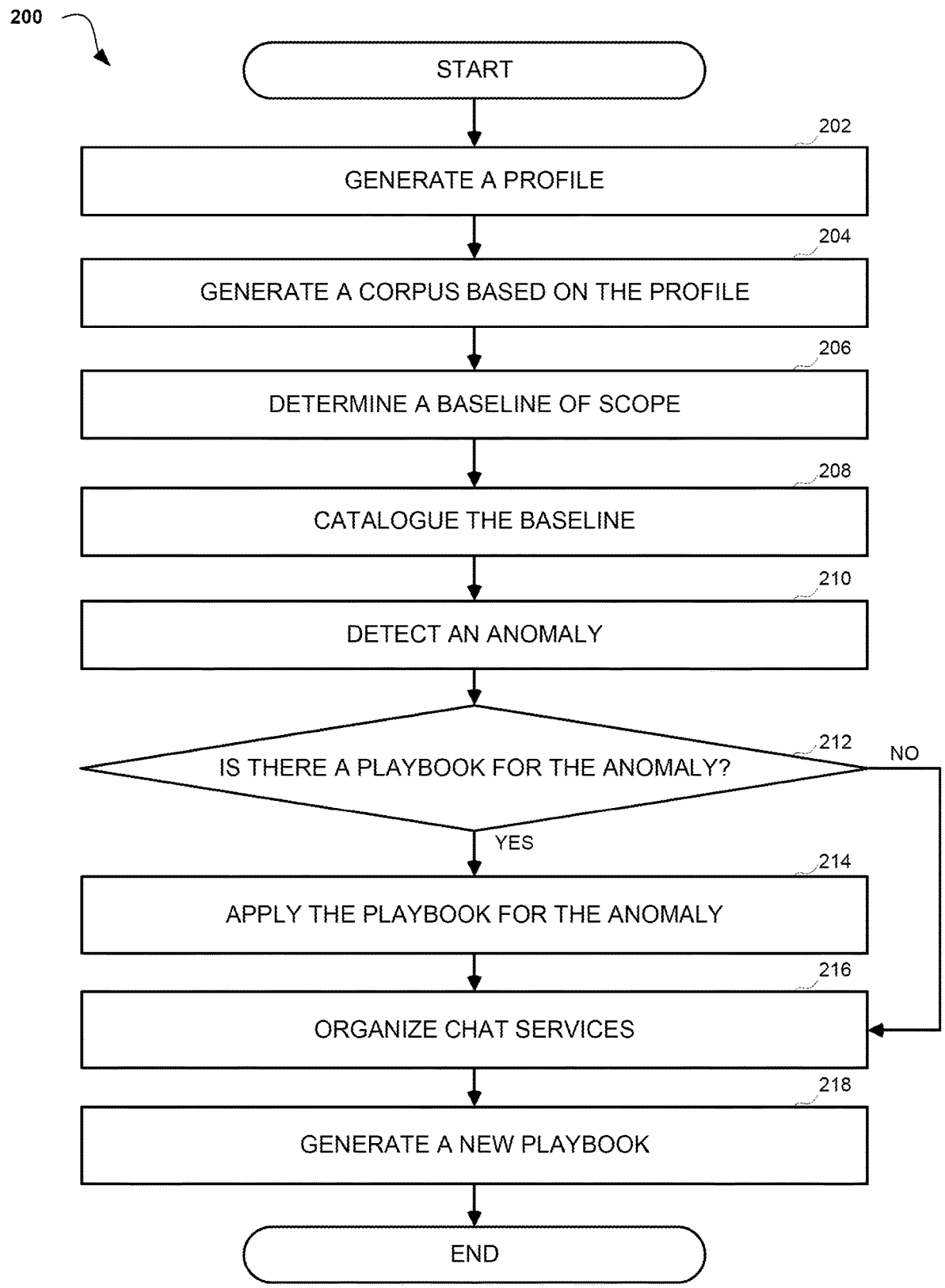
FIG. 2 is an operational flowchart illustrating a software anomaly management process according to at least one embodiment.

Referring now to FIG. 2, an operational flowchart illustrating a software anomaly management process 200 is depicted according to at least one embodiment. At 202, the software anomaly management program 110A, 110B generates a profile. As previously mentioned, each registered user profile is stored in the profile corpus 118 and may include user access credential, software and system names and descriptions, previous anomalies, email and social media accounts, etc. According to an example embodiment, the software anomaly management program 110A, 110B may request a user using a graphical user interface (GUI) opt in for the services and allow access to data that is collected in step 204. In another embodiment, the software anomaly management program 110A, 110B may analyze operating system log files to identified all of the installed software programs or services and present it to the user via GUI.

Next, at 204, the software anomaly management program 110A, 110B generates a corpus based on the profile. According to an example embodiment, the software anomaly management program 110A, 110B may map applications, systems and other resources in the profile corpus 118 database identified, or selected by the user, during profile generation. According to an example embodiment, the software anomaly management program 110A, 110B may collect and map the title and organizational chart of the user, extract all calendar meetings of the user, extract all contacts associated with user emails and other messages, keywords the user used with each contact during email or message exchanges, system and application names the user mentioned during email or message exchanges, tickets the user opened or followed and other anomalies the user reported. In addition, the software anomaly management program 110A, 110B may identify previous tickets the user opened, time spent on each ticket, and the results of each opened ticket. In another embodiment, software anomaly management program 110A, 110B may identify sensor and log data associated with an application, data regarding devices the user is using, such as age of the device, IP address and hardware/software parameters. According to an example embodiment, the software anomaly management program 110A, 110B may use a word embedding engine to extract the requested data that converts words or phrases to multidimensional vectors that then may be analyzed to identify relations to one or more systems and/or software programs. In another embodiment, the software anomaly management program 110A, 110B may request the user fill in the required information using the GUI.

Then, at 206, the software anomaly management program 110A, 110B determines a baseline of scope. According to an example embodiment, the software anomaly management program 110A, 110B may establish for each of the identified applications, resources or systems from in the generated corpus, a function, an associated user, frequency of usage, time of usage, and other metrics. The software anomaly management program 110A, 110B may determine the metrics based on analyzing the log files of the device, such as client computing device 102 or server 112, or by requesting input from the user using the GUI.

Next, at 208, the software anomaly management program 110A, 110B catalogues the baseline. According to an example embodiment, the software anomaly management program 110A, 110B may catalogue the identified parameters in the baseline catalogue 120 that enables storing values and parameters associated with each software, service or system that was identified by the software anomaly management program 110A, 110B. In another embodiment, the software anomaly management program 110A, 110B may determine the baseline and catalogue it as an average value by collecting the data from step 206 for a predetermined timeframe and averaging the values. For example, the software anomaly management program 110A, 110B may determine that the user prints a report from a specific software four times a day on an average for the last ten days and the printing takes one minute, thus the software anomaly management program 110A, 110B may store the values 4 and 1 in the baseline catalogue 120.

Then, at 210, the software anomaly management program 110A, 110B detects an anomaly. According to an example embodiment, the software anomaly management program 110A, 110B may monitor all of the applications, resources and systems identified in step 206 for an anomaly. According to an example embodiment, the software anomaly management program 110A, 110B may identify an anomaly based on monitoring log files for known errors and/or deviation of the values from the baseline catalogue 120. The anomaly may be identified using different approaches such as Gaussian distribution, exponential distribution parabolic fractal distribution or any other form of distribution. Upon identification of an anomaly, the software anomaly management program 110A, 110B may detect the associated data that may be related to the anomaly from the profile 118 and baseline catalogue 120. To continue the previous example, if the baseline includes a value that printing typically takes 1 minute and, after monitoring, the value is five minutes, the software anomaly management program 110A, 110B may treat it as an anomaly.

Then, at 212, the software anomaly management program 110A, 110B determines whether there is a playbook for the anomaly. The playbook may be a record in the playbook repository 130 that stores an anomaly identifier (such as an error code), an anomaly name, a source code that was injected in order to resolve the anomaly and names, organization, title and emails of professionals that were involved in resolving the anomaly. In another embodiment, the playbook may include date and time the playbook was opened and resolved, associated with the anomaly screenshots, logfiles and other timeframe and data related to the anomaly. According to an example embodiment, software anomaly management program 110A, 110B may search for the anomaly identification in the playbook repository 130. If the software anomaly management program 110A, 110B determines that there is a playbook for the anomaly (step 212, "YES" branch), the software anomaly management program 110A, 110B may continue to step 214 to apply the playbook for the anomaly. If the software anomaly management program 110A, 110B determines that there is no playbook for the anomaly (step 212, "NO" branch), the software anomaly management program 110A, 110B may continue to step 216 to organize chat services. According to an example embodiment, the software anomaly management program 110A, 110B may identify the playbook for the anomaly in the playbook repository 130. The identification may be performed using search, such as by matching the error name, error code, ticket number from the logfile or anomaly name or value of the software program 108 to the associated playbook in the playbook repository 130. In another embodiment, the software anomaly management program 110A, 110B may utilize word embedding of the anomaly parameter to identify the closest possible playbook in the playbook repository 130. For example, the anomaly may be transferred to a multi-dimensional vector using a trained neural network, such as Word2Vec or a similar technique, and then, by utilizing linear algebraic calculations, the closest available playbook to the generated vector may be identified in the playbook repository 130.

Next, at 214, the software anomaly management program 110A, 110B applies the playbook for the anomaly. According to an example embodiment, when the identified playbook includes a software program or a source code, the software anomaly management program 110A, 110B may automatically execute the software or incorporate the source code in the application, such as software application 108, by injecting the source code in a sandbox environment in order to check whether the code resolves the anomaly. In another embodiment, the software anomaly management program 110A, 110B may send the source code from the playbook to the professional that is in the playbook list of members that participated in resolving the error in the playbook in order to recompile the source code using the source code in the playbook record.

Then, at 216, the software anomaly management program 110A, 110B organizes chat services. According to an example embodiment, the software anomaly management program 110A, 110B may identify a group of professionals based on the anomaly from searching the playbook repository 130. According to an example embodiment, if an associated playbook was identified in step 212, the software anomaly management program 110A, 110B may extract the members of the group from the playbook and generate a chat, conference call or other collaboration platform, when the platform may be predetermined by a user or chosen automatically based on a number of the identified members. For example, if the number of the identified members of the group is less than five the software anomaly management program 110A, 110B may utilize a web conference call. Even when the appropriate playbook was previously identified and resolved the anomaly, still chat services are required in order to review the playbook. In another embodiment, the software anomaly management program 110A, 110B may organize relevant information that is collected, correlated, and prepared for an upcoming chat session from the profile corpus 118, baseline catalogue 120, and playbook repository 130. In a further embodiment, if a member is not available or a new member needs to be added, software anomaly management program 110A, 110B may analyze the roles of the members from the playbook repository 130, such as by clustering the members or anomalies using the K-means clustering, and adding a member from the same cluster with similar skills according to the role of the member. Yet in another embodiment, the software anomaly management program 110A, 110B may use a topical correlation to identify members of the group, where the topical correlation between the anomalies may be performed using a correlation model, such as a bag of words, Word2Vec, BERT or other correlation models.

Next, at 218, the software anomaly management program 110A, 110B generates a new playbook. According to an example embodiment, the software anomaly management program 110A, 110B may generate a new playbook for the anomaly based on determining that no playbook was identified or the group amended the playbook or added and/or excluded one or more members from the group. In another embodiment, the software anomaly management program 110A, 110B may use speech-to-text and language processing tools to monitor the chat and update the playbook based on the messages. For example, if one of the members replies that he is unrelated to the anomaly and leaves the chat services, the software anomaly management program 110A, 110B may update the playbook and remove the member. In further embodiments, the software anomaly management program 110A, 110B may store the generated new playbook in the playbook repository 130. In further embodiments, the software anomaly management program 110A, 110B may add or remove members based on an amount of time taken to resolve similar anomalies with different members while prioritizing the group of members that resolved the anomaly faster.

It may be appreciated that FIG. 2 provides only an illustration of one implementation and does not imply any limitations with regard to how different embodiments may be implemented. Many modifications to the depicted environments may be made based on design and implementation requirements. For example, the software anomaly management program 110A, 110B may be used to identify errors (anomalies) in machines and production processes and based on the previous chats and anomalies generate a new playbook and chat services with the members to resolve the anomaly.

Figure 3:
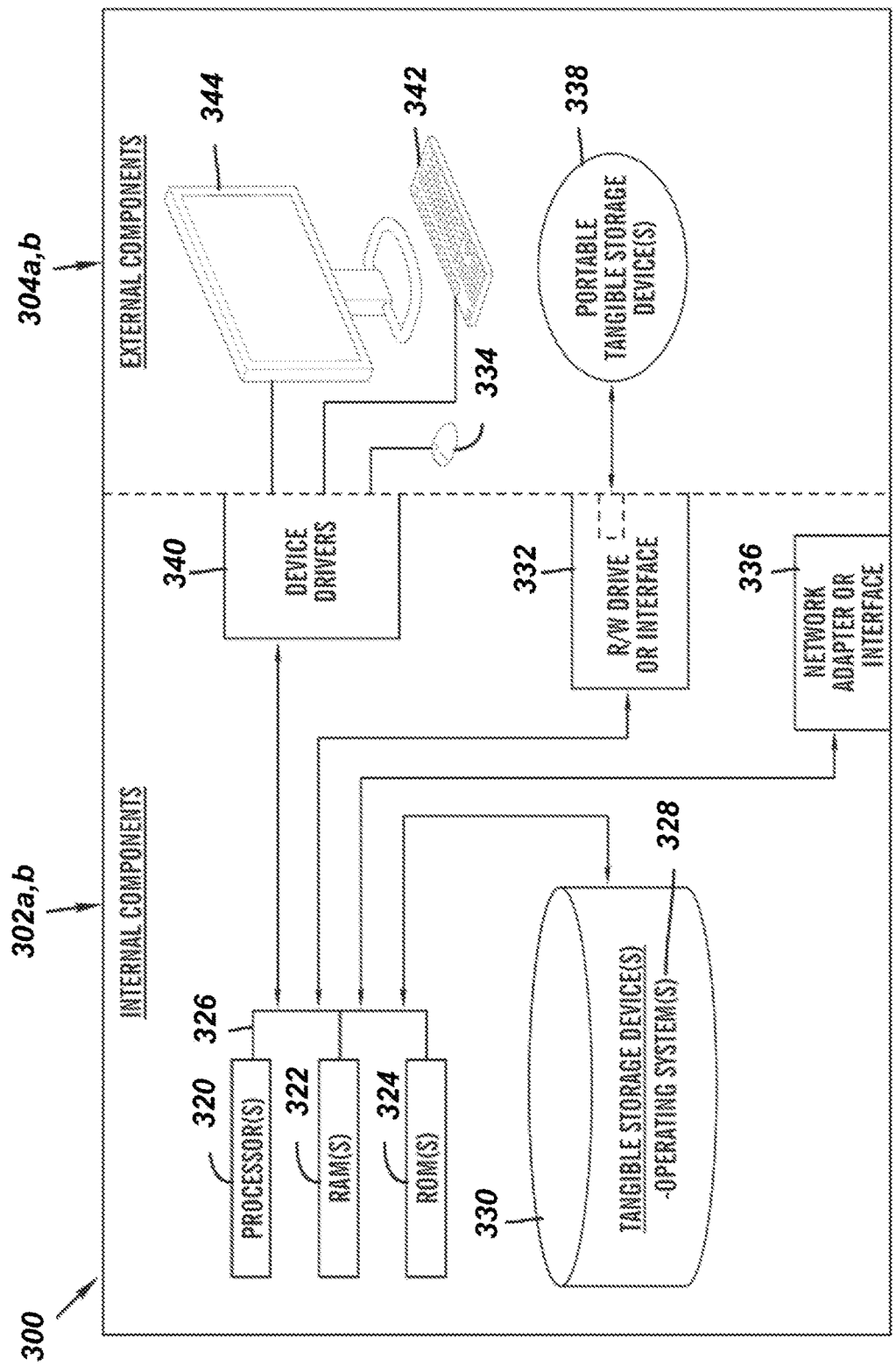
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the software anomaly management program 110A in the client computing device 102, and the software anomaly management program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the software anomaly management program 110A, 110B, can be stored on one or more of the respective portable computer-readable tangible storage devices 338, read via the respective R/W drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The software program 108 and the software anomaly management program 110A in the client computing device 102 and the software anomaly management program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the software anomaly management program 110A in the client computing device 102 and the software anomaly management program 110B in the server 112 are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices. Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
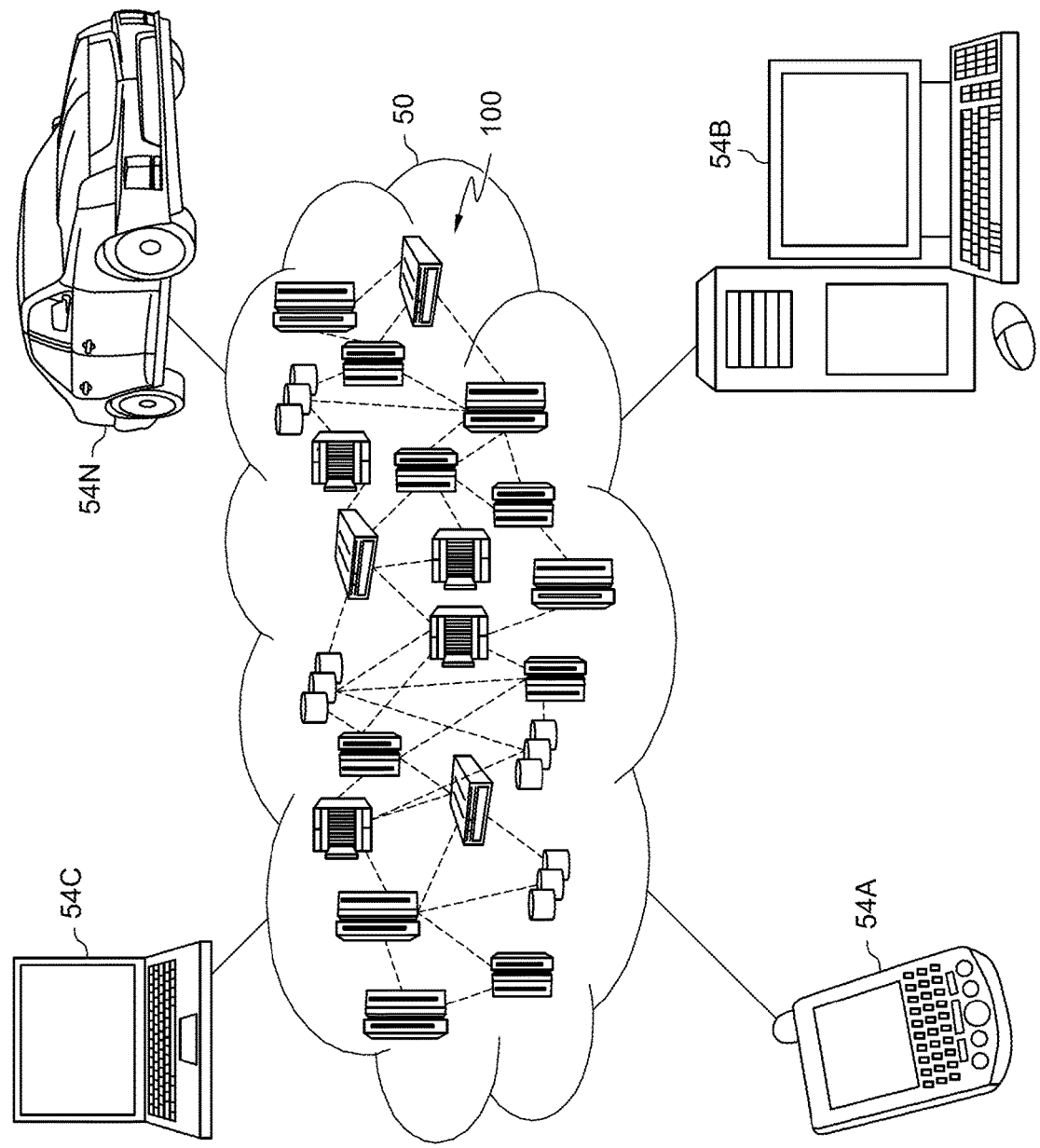
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
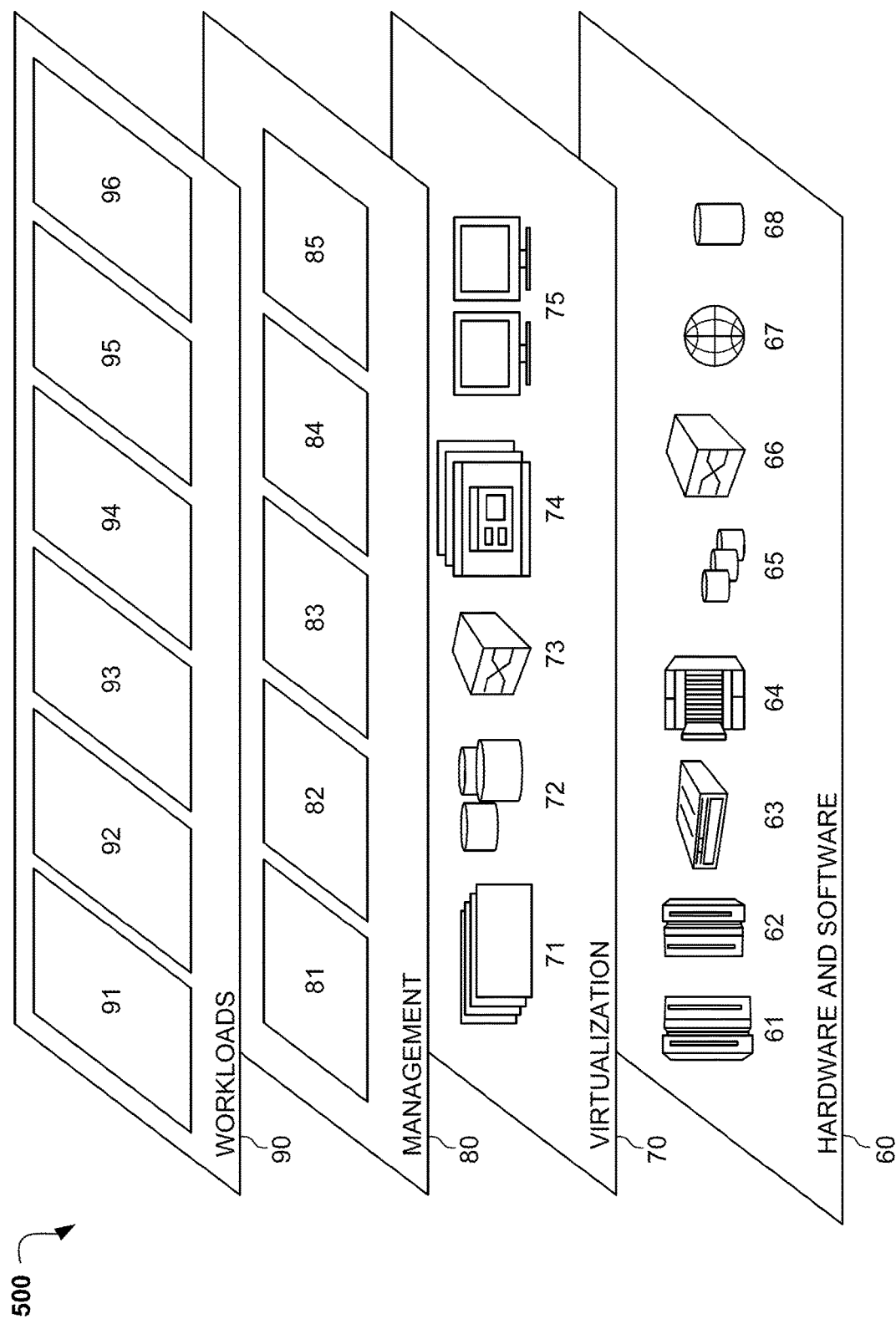
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system anomaly management 96. System anomaly management 96 may relate to monitoring the system for an anomaly and, based on determining the anomaly, identifying a playbook and a group of members that may resolve the anomaly, and organizing a chat between the members of the group to resolve the anomaly and update the playbook.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for software anomaly management, the method comprising:
   generating a profile, wherein the profile comprises one or more programs to monitor;
   determining a baseline for each of the one or more programs by collecting one or more values associated with a normal operation for each of the one or more programs;
   detecting an anomaly based on deviation of the one or more values from the normal operation;
   based on identifying a playbook for resolving the anomaly, automatically applying source code from the playbook on a program from the one or more programs; and
   organizing chat services based on identifying one or more members associated with the anomaly;
   identifying the playbook for the anomaly is by a trained neural network.

2. The method of claim 1, further comprising:
   in response to determining the playbook does not exist for the anomaly:
      generating a new playbook based on data extracted from the chat services; and
      storing the new playbook in playbook repository.

3. The method of claim 1, wherein detecting the anomaly based on deviation of the one or more values from the normal operation further comprises:
   monitoring the one or more values in real time; and
   determining the deviation of the one or more values from the normal operation using a Gaussian distribution approach.

4. The method of claim 1, wherein identifying one or more members associated with the anomaly is by topical correlation performed on previous chats to identify the one or more members.

5. The method of claim 4, wherein the topical correlation is performed using a Word2Vec method.

6. The method of claim 1, wherein applying the playbook on the program further comprises:
   injecting the source code of the playbook in a sandbox environment.

7. A computer system for software anomaly management, the computer system comprising:
   one or more processors, one or more computer-readable memories, one or more computer-readable tangible storage medium, and
   program instructions stored on at least one of the one or more tangible storage medium for execution by at least one of the one or more processors via at least one of the one or more memories, wherein the computer system is capable of performing a method comprising:
   generating a profile, wherein the profile comprises one or more programs to monitor;
   determining a baseline for each of the one or more programs by collecting one or more values associated with a normal operation for each of the one or more programs;
   detecting an anomaly based on deviation of the one or more values from the normal operation;
   based on identifying a playbook for resolving the anomaly, automatically applying source code from the playbook on a program from the one or more programs; and
   organizing chat services based on identifying one or more members associated with the anomaly;
   identifying the playbook for the anomaly is by a trained neural network.

8. The computer system of claim 7, further comprising:
   in response to determining the playbook does not exist for the anomaly:
      generating a new playbook based on data extracted from the chat services; and
      storing the new playbook in playbook repository.

9. The computer system of claim 7, wherein detecting the anomaly based on deviation of the one or more values from the normal operation further comprises:
   monitoring the one or more values in real time; and
   determining the deviation of the one or more values from the normal operation using a Gaussian distribution approach.

10. The computer system of claim 7, wherein identifying one or more members associated with the anomaly is by topical correlation performed on previous chats to identify the one or more members.

11. The computer system of claim 10, wherein the topical correlation is performed using a Word2Vec method.

12. The computer system of claim 7, wherein applying the playbook on the program further comprises:
   injecting the source code of the playbook in a sandbox environment.

13. A computer program product for software anomaly management, the computer program product comprising:
   one or more computer-readable tangible storage medium and program instructions stored on at least one of the one or more tangible storage medium, the program instructions executable by a processor, the program instructions comprising:
   program instructions to generate a profile, wherein the profile comprises one or more programs to monitor;
   program instructions to determine a baseline for each of the one or more programs by collecting one or more values associated with a normal operation for each of the one or more programs;
   program instructions to detect an anomaly based on deviation of the one or more values from the normal operation;
   based on identifying a playbook for resolving the anomaly, automatically applying source code from the playbook on a program from the one or more programs; and
   program instructions to organize chat services based on identifying one or more members associated with the anomaly;
   program instructions to identify the playbook for the anomaly is by a trained neural network.

14. The computer program product of claim 13, further comprising:
   in response to determining the playbook does not exist for the anomaly:
      program instructions to generate a new playbook based on data extracted from the chat services; and
      program instructions to store the new playbook in playbook repository.

15. The computer program product of claim 13, wherein detecting the anomaly based on deviation of the one or more values from the normal operation further comprises:
   monitoring the one or more values in real time; and
   determining the deviation of the one or more values from the normal operation using a Gaussian distribution approach.

16. The computer program product of claim 13, wherein identifying one or more members associated with the anomaly is by topical correlation performed on previous chats to identify the one or more members.

17. The computer program product of claim 16, wherein the topical correlation is performed using a Word2Vec method.

* * * * *